United States Patent [19]

Hegemann et al.

[11] Patent Number: 4,627,965
[45] Date of Patent: Dec. 9, 1986

[54] METHOD OF DESULFURIZING INDUSTRIAL FLUE GASES

[75] Inventors: Karl-Rudolf Hegemann, Essen-Bergerhausen; Ulrich Kleeberg, Mühlheim/Ruhr, both of Fed. Rep. of Germany

[73] Assignee: Gottfried Bischoff Bau Kompl. Gasreinigungsund Wasserrückkühlanlagen GmbH & Co., Essen, Fed. Rep. of Germany

[21] Appl. No.: 824,933

[22] Filed: Jan. 31, 1986

Related U.S. Application Data

[63] Continuation of Ser. No. 640,704, Aug. 14, 1984, abandoned.

[30] Foreign Application Priority Data

Aug. 17, 1983 [DE] Fed. Rep. of Germany ....... 3329633

[51] Int. Cl.$^4$ .............................................. C01B 17/00
[52] U.S. Cl. .................................. 423/242; 423/166; 423/555
[58] Field of Search .......... 423/242 A, 242 R, 244 A, 423/244 R, 166, 555

[56] References Cited

U.S. PATENT DOCUMENTS

| 2,080,779 | 5/1937 | Lessing ................. 423/242 |
| 4,080,428 | 3/1978 | Hölter et al. ........... 423/242 |

FOREIGN PATENT DOCUMENTS

| 2532373 | 1/1977 | Fed. Rep. of Germany . |
| 2925468 | 8/1981 | Fed. Rep. of Germany ...... 423/555 |
| 49-105796 | 7/1974 | Japan ................... 423/242 |
| 50-23393 | 3/1975 | Japan ................... 423/555 |
| 50-44192 | 4/1975 | Japan ................... 423/555 |
| 50-67775 | 6/1975 | Japan ................... 423/242 |
| 52-9698 | 1/1977 | Japan ................... 423/242 |
| 53-137871 | 1/1978 | Japan ................... 423/555 |

Primary Examiner—Gregory A. Heller
Attorney, Agent, or Firm—Karl F. Ross; Herbert Dubno

[57] ABSTRACT

A method of and an apparatus for the desulfurization of an industrial flue gas wherein the recirculating scrubbing liquid is sprayed with atomization into the scrubbing zone of a column and the droplet size, degree of atomization and gas flow velocity are controlled so that the pH of the scrubbing liquid within the scrubbing zone is substantially 3 to 6, preferably 4 to 5. In the sump oxidation is carried out by the introduction of oxygen to oxidize the calcium sulfite and calcium hydrogen sulfite which is formed to calcium sulfate.

2 Claims, 1 Drawing Figure

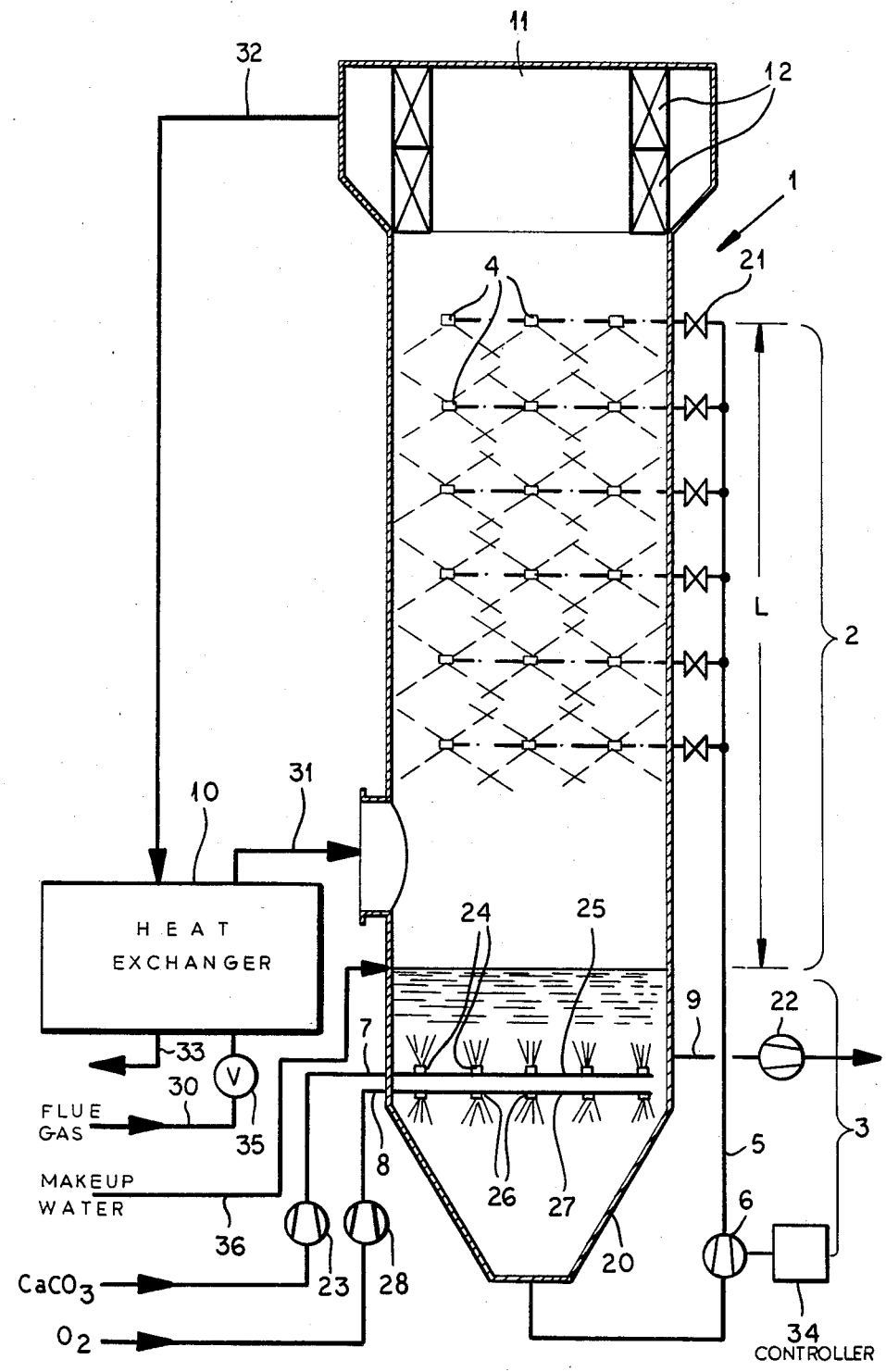

METHOD OF DESULFURIZING INDUSTRIAL FLUE GASES

CROSS REFERENCE TO RELATED APPLICATIONS

This is a continuation of co-pending application Ser. No. 640,704, filed on Aug. 14, 1984, now abandoned.

Our present application is related to the commonly assigned copending applications Ser. No. 402,570 filed July 28, 1982, (now abandoned) Ser. No. 546,486 filed Oct. 28, 1983 (now U.S. Pat. No. 4,503,020) and Ser. No. 559,916 filed Dec. 9, 1983, (now U.S. Pat. No. 4,576,803) and to the applications and patents mentioned therein. (See also U.S. Pat. Nos. 4,304,570 and 4,415 142.)

FIELD OF THE INVENTION

Our present invention relates to a method of desulfurizing industrial flue gases and, more particularly, to systems, e.g. scrubbing columns and methods of operating same, for the removal of sulfur-containing compounds, especially sulfur dioxide and oxidizable sulfur compounds utilizing as a scrubbing agent water in which a calcium-containing compound such as calcium oxide, calcium hydroxide or calcium carbonate is dispersed.

BACKGROUND OF THE INVENTION

As can be gathered inter alia from the aforementioned applications and patents, one of the principal ways of insuring satisfactory removal of sulfur and sulfur compounds from industrial flue gases produced by the combustion of fossil fuels, is the scrubbing of such gases with water containing such calcium compounds.

In scrubbers operating in accordance with these principles, the scrubbing solution and suspension is recirculated, i.e. the sump product of the column is collected and recycled to the head of the column so that within the column the descending scrubbing liquid passes in counterflow to the rising flue gases.

In the sump or, stated equivalently, at a lower portion of this column, an oxidation is carried out using air or another oxygen-containing gas so that any calcium sulfite or calcium hydrogen sulfite (calcium bisulfite) is oxidized to calcium sulfate which can be recovered from the scrubbing liquid circulation.

This means that a scrubber will be provided with a pump recirculating the scrubbing liquid from the sump to the head or upper portion of the column, with auxiliary means for the introduction of air, with means for introducing calcium carbonate as the preferred calcium compound into the scrubbing liquid, and means for withdrawing material from the sump product or the sump product itself.

The flue gas to be treated may have previously been cooled in a heat exchanger before passage through the scrubber and may pass through the heat exchanger again after scrubbing.

An apparatus working in accordance with these principles has been illustrated and described in *VGB-Kraftwerkstechnik,* 1983, pages 335–344, FIGS. 8, 9 and 10. This system operates quite satisfactorily and represents an efficient system for the desulfurization of flue gas although the efficiency of its operation has been found to vary with different operating conditions. Furthermore it is always desirable to increase the efficiency of such a system.

OBJECTS OF THE INVENTION

It is, therefore, the principal object of the present invention to provide an improved method of desulfurizing a flue gas in which the efficiency can be increased over the system described earlier and wherein the efficiency of the system is less dependent than heretofore upon fluctuating operating conditions.

Another object of this invention is to provide an improved method of operating a scrubber so that some of the even limited drawbacks of the prior art system can be obviated.

Still further it is an object of this invention to provide a method of desulfurizing a flue gas which enables in a simple manner the efficiency to be adjusted to the varying operating conditions and thus which allows optimum removal of sulfur from the flue gas.

SUMMARY OF THE INVENTION

We have discovered, quite surprisingly, that these objects can be attained in a method of the type last described wherein the scrubbing liquid, i.e. the suspension of calcium carbonate in water, is sprayed into the washing zone in an atomized and thus highly finely divided form at a pH value of 3 to 6, preferably 4 to 5 inclusive, and that the pH is adjusted to this value before spraying and further that the oxidation is carried out in the oxidizing zone of the column at this pH.

While we are not fully able to explain the reasons why these unique results are obtained, it would appear that the uptake of the sulfur dioxide by the scrubbing liquid is a diffusion and/or solution process at the liquid/gas interface and that under the conditions specified, the reduced particle size of the spray cooperates with the selected pH range to induce a far more efficient uptake of the sulfur dioxide by the scrubbing liquid. It appears that the greater this interface, the more rapid the uptake of the sulfur dioxide and that the pH in this range tends to drive the equilibrium dramatically in favor of the uptake.

We have discovered that, while there are numerous factors which control the efficiency of uptake of sulfur dioxide from a flue gas, including the size of the interface as discussed above and the contact time of the flue gas with the scrubbing liquid which is in part determined by the residence time of the scrubbing liquid in the gas or, conversely, the gas in the scrubber, there is one factor which apparently has not been recognized which is absolutely essential with respect to restriction of the efficiency of uptake and hence the degree of removal of sulfur oxides for a given residence time in the scrubber.

When the calcium carbonate is introduced into the scrubbing liquid, only the portion thereof in solution actually contributes calcium ions which are capable of binding with the sulfur dioxide or bisulfite ions to form a calcium sulfite or calcium hydrogen sulfite. Investigations have shown that even though the calcium carbonate may be introduced into the scrubbing liquid, dissolution of the calcium carbonate, if not complete, will result in the deposit of the calcium sulfite or calcium hydrogen sulfite or calcium sulfate upon these particles and result in a masking of the calcium carbonate from contact with the solution and thus impede the calcium carbonate passage into solution.

We have found, moreover, that this specific problem is eliminated by controlling the pH both during the washing stage and during the oxidation stage so that at both locations in the system, the pH is between 3 and 6 and preferably is 4 to 5, inclusive. At lower pHs, the efficiency falls off and at higher pHs, e.g. a pH upwards of 6 and to about 7, the calcium sulfite which is formed tends to precipitate onto the calcium carbonate particles.

The scrubber for carrying out the method of the invention thus comprises a sump provided with an oxidation zone and, in the column above the sump, a scrubbing zone which is provided with a multiplicity of atomizing nozzles for the scrubbing liquid. The atomizing nozzles are designed to spray the droplets of scrubbing liquid in an especially fine spray with particles in the micron to tens of microns range. The oxidation zone is provided with means for introducing air and/or calcium carbonate while the sump can also be provided with means for drawing off the desulfurization sludge or slurry.

At an upper end of the column, means can be provided for discharging the scrubbed gas while at a lower portion of the scrubbing zone the column or tier can be formed with an inlet, preferably directly above the sump, for introducing the flue gas to be scrubbed.

The scrubbing zone has a length and the droplets of the scrubbing liquid a mean droplet size which are selected with respect to the flow velocity of the flue gas, that the droplets entering the oxidation zone after pickup of the sulfur dioxide, primarily have a pH in the aforementioned range of 3 to 6, and preferably 4 to 5.

For control of the parameters of the operation of the column, it has been found to be advantageous to be able to control the degree of atomization of the scrubbing liquid. However, it is also possible to control the flue gas velocity and this may be done apart from control of the degree of atomization or in addition thereto. It is possible that the control of the flue gas velocity will be limited, however, because of the requirements of the upstream apparatus, e.g. a combustion chamber, from which the flue gas derives.

For compensating the operation of the apparatus to the varying requirements, we may also provide a plurality of atomizing nozzles disposed in tiers and to provide separate controls for the nozzles of each tier, thereby adjusting the residence time of the droplets of the scrubbing liquid in the scrubbing zone.

BRIEF DESCRIPTION OF THE DRAWING

The above and other objects, features and advantages of the present invention will become more readily apparent from the following description, reference being made to the accompanying drawing in which the sole FIGURE is a flow diagram illustrating the method of the invention and diagrammatically illustrating a scrubbing column which can be used for this apparatus.

SPECIFIC DESCRIPTION

In the drawing we have shown a scrubbing column 1 which is provided at an intermediate location along its height with a scrubbing zone 2 and at its lower end is formed with a sump 20 forming an oxidation zone 3. Within the scrubbing zone 2, a multiplicity of atomizing nozzles 4 are provided in a number of distinct tiers or levels (6 such tiers being shown) each tier having a respective valve 21 which can be closed to cut off that tier or opened to enable that tier to be effective.

A circulating pump 6 draws the scrubbing liquid from the sump 20 of the column and circulates it along a circulating path or cycle 5 to the nozzles.

An outlet 9 provided with a pump 22 is connected to the sump to carry off the calcium sulfate slurry, e.g. for the recovery of gypsum as described in the aformentioned copending applications.

An inlet 7 provided with blower 23 is connected to injectors 24 of a manifold 25 for introducing calcium carbonate in an air stream and additional air may be introduced through the nozzles 26 from a manifold 27 connected to an inlet 8 and a blower 28 for oxidation of the calcium sulfite or calcium hydrogen sulfite in the sump liquid to calcium sulfate.

A droplet separator 12 is provided at the head 11 of the column and returns the droplets to the interior of the column. The incoming flue gas at 30 is cooled in the indirect heat exchanger 10 before entering at 31 the lower portion of the scrubbing zone 2.

The scrubbed flue gas at 32 is heated in the heat exchanger 10 by indirect heat exchange with the flue gas and can be fed at 33 to further cleaning means or to a stack for discharge into the atmosphere at the reheated temperature.

The apparatus is so dimensioned that the scrubbing liquid in the scrubbing zone 2 has a pH of 4 to 5 and the oxidation in the oxidation zone 3 will be carried out at this pH. If there is any danger that the pH will rise excessively, the calcium carbonate addition can be reduced or a small amount of sulfuric acid can be added to the sump. If there is a danger of a pH reduction below 3, lime can be added to the calcium carbonate. In any event, the length L of the scrubbing zone is dimensioned with respect to the particle size of the scrubbing liquid and the flow velocity of the flue gas so that the pH is 4 to 5 both in the scrubbing zone and in the oxidation zone.

The degree of atomization can be controlled by varying the pump pressure via a controller 34 constituting means for varying the degree of atomization. The flow velocity of the flue gas can also be controlled, e.g. by about 35 if the boiler or other source of the flue gas will admit of such variation. The velocity may also be controlled for a given flue gas supply rate by connecting parallel scrubbers of the type shown of the source of the flue gas or disconnecting such additional scrubbers. The valves 21 may also be selectively controlled to vary the mean residence time of the droplets in the scrubber.

Makeup water can be added as represented by line 36.

We claim:

1. A method of desulfurizing an industrial flue gas which comprises the steps of:
   (a) providing a scrubbing colum defining (i) in an upper region of said column a scrubbing zone of predetermined length traversed by a plurality of atomizing nozzles arranged in a plurality of vertically spaced multinozzle tiers having separate control valves for selective blocking of fluid access thereto, and (ii) in a lower region of said column an oxidation zone below said scrubbing zone;
   (b) spraying a scrubbing liquid including calcium carbonate in aqueous solution into said upper region of said column through at least one selected tier of said nozzles, under pressure of a pump communicating with said nozzles, to form atomized droplets of said scrubbing liquid of a predetermined mean droplet size moving downwardly through said scrubbing zone;

(c) passing said flue gas upwardly through said scrubbing zone in countercurrent flow to said droplets of said scrubbing liquid while, with reference to the mean droplet size, the rate of flow of said flue gas through said scrubbing zone and the length of the latter, controlling the mean residence time of said droplets in said scrubbing zone by regulating said pump pressure and by selectively activating said control valves to permit the flow of said scrubbing liquid to and through said at least one tier of said nozzles, for effecting an uptake of sulfur dioxide by said droplets from said flue gas, during the movements of said flue gas and said droplets through said scrubbing zone, sufficient to impart to said scrubbing liquid in said droplets a pH between 3 and 6, whereby calcium sulfite and calcium hydrogen sulfite form and collect in a body of said scrubbing liquid in said lower region of said column and said body of said scrubbing liquid has the same pH between 3 and 6 as said droplets of said scrubbing liquid;

(d) oxidizing the calcium sulfite and calcium hydrogen sulfite in said body of said scrubbing liquid in said oxidation zone at said same pH to form calcium sulfate;

(e) introducing calcium carbonate into said body of said scrubbing liquid in said lower region of said column; and (f) circulating said scrubbing liquid by means of said pump from said lower region of said column to said at least one tier of said nozzles and therethrough into said scrubbing zone in the form of said atomized droplets of said scrubbing liquid.

2. The method defined in claim 1 wherein the mean residence time of said droplets of said scrubbing liquid in said scrubbing zone is controlled to ensure that the sulfur dioxide uptake is sufficient to impart to said droplets of said scrubbing liquid and hence to said body of said scrubbing liquid a pH between 4 and 5, inclusive.

* * * * *